(12) United States Patent  
Blessing et al.

(10) Patent No.: US 6,369,358 B1  
(45) Date of Patent: Apr. 9, 2002

(54) INTELLIGENT WIPER REST HEATER

(75) Inventors: Alf Blessing, Heiningen; Rainer Mäckel, Königswinter, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/664,664

(22) Filed: Sep. 19, 2000

(30) Foreign Application Priority Data

Sep. 30, 1999 (DE) .......................................... 199 46 824

(51) Int. Cl.$^7$ ................................................. B60L 1/02

(52) U.S. Cl. ...................................................... 219/203

(58) Field of Search ................................ 219/202, 203, 219/205; 15/250.05, 250.06; 318/265, 266, 286

(56) References Cited

U.S. PATENT DOCUMENTS

| | | | | | |
|---|---|---|---|---|---|
| 3,639,938 | A | * | 2/1972 | Golden | 15/250.16 |
| 4,109,133 | A | * | 8/1978 | Hanle et al. | 219/203 |
| 5,278,480 | A | * | 1/1994 | Murray | 318/626 |
| 5,551,119 | A | * | 9/1996 | Worwag | 15/339 |
| 5,932,983 | A | * | 8/1999 | Maue et al. | 229/87.19 |
| 6,113,138 | A | * | 9/2000 | Hermann et al. | 280/735 |

* cited by examiner

*Primary Examiner*—Sang Paik  
(74) *Attorney, Agent, or Firm*—Venable; Norman N. Kunitz

(57) ABSTRACT

A wiper rest heater is connected to a sensor. The sensor, when temperatures are low, directly or indirectly measures whether or not the windshield wiper can be moved when the wiper motor is switched on, without thereby damaging the wiper blade element or the motor. As a function of this, the wiper rest heater is then either switched on or off by an intelligent control.

14 Claims, 3 Drawing Sheets

INTELLIGENT WIPER REST HEATER

CROSS-REFERENCE TO RELATED APPLICATION

This application is based upon and claims priority to German Patent Application 199 46 824.9 filed Sep. 30, 1999, which application is herein expressly incorporated by reference.

BACKGROUND OF THE INVENTION

The present invention relates to a wiper rest heater for de-icing frozen or snowed-in windshield wipers.

When temperatures are low, the windshield wiper blade elements can, on occasion, freeze to the windshield, particularly when parking overnight in exposed places. If the driver of the vehicle then switches the windshield wiper on, to clear the shield for example, then either the motor can be blocked and damaged or the windshield wiper blade elements can be damaged as they break free.

Therefore, in the case of previous vehicles, the area of the windshield on which the windshield wiper/s is/are located in the rest position is heated by a wiper rest heater. The heating enables the frozen-on wiper to be freed. The criterion for switching on is the external temperature and the ignition being switched on. If the external temperature falls below a specific limiting value then, if the ignition is switched on, the wiper rest heater is switched on irrespective of whether the wiper is frozen-on or not. However, the disadvantage of this is that the heating requires several hundred watts of electrical power, thus significantly increasing the fuel consumption because the heating always remains switched on or at least remains on for a specific time, no matter whether this is necessary or not.

DE 42 35 114 A1 discloses a motor vehicle with a windshield, in which the windshield wipers of a motor vehicle are arranged in the cowling which is located on the lower edge of a windshield. A separate air ducting channel is provided on the inside of the vehicle which directs warm air to the wiper rest area of the windshield wipers in order to free iced-up or snowed-in windshield wipers. A ribbed heat-transfer body, which is connected to the windshield via an adhesive layer with high thermal conductivity, is arranged on the inside of the windshield in the area of the hot air outlet in order to improve the heat transfer to the windshield.

However, the disadvantages of this are that the de-icing of the windshield wiper takes a relatively long time, and the heater heats the wiper rest even when the windshield wipers are not frozen to the windshield or covered with snow. The heater is automatically switched on together with the ventilation in the interior of the vehicle.

SUMMARY OF THE INVENTION

The object of the invention is to provide a reduction of the energy consumption of a wiper rest heater of the type mentioned at the beginning, which is needed to ensure that the windshield wipers also function properly at low temperatures and to speed up thawing times.

In accordance with the invention this task is solved by the wiper rest heater connected to a sensor which measures whether the windshield wipers move or not while the windshield wiper motor is switched on. This information is then evaluated in an evaluation unit. With the result that the wiper rest heater is then switched on and off in such a way that the wiper rest heater is only then switched on if the windshield wipers are actually frozen.

A further advantage is achieved by a revolution sensor on the wiper motor which is used as a sensor, or it is designed as an ammeter which measures the current through the wiper motor. The sensor can also be designed as a movement sensor which directly measures the movement of the windshield wipers.

The advantages achieved with the invention are exact switching on of the wiper rest heater, which is only switched on when it is actually needed, that is, only when the windshield wipers are actually frozen and can no longer be moved. In the same way, it can also be switched off exactly, namely precisely when the thawing process has ended.

From the following detailed description, taken in conjunction with the drawings and subjoined claims, other objects and advantages of the present invention will become apparent to those skilled in the art.

BRIEF DESCRIPTION OF THE DRAWINGS

The invention is described in more detail below by means of embodiments and figures. They show.

DETAILED DESCRIPTION OF THE PREFERRED EMBODIMENT

Figure 1:
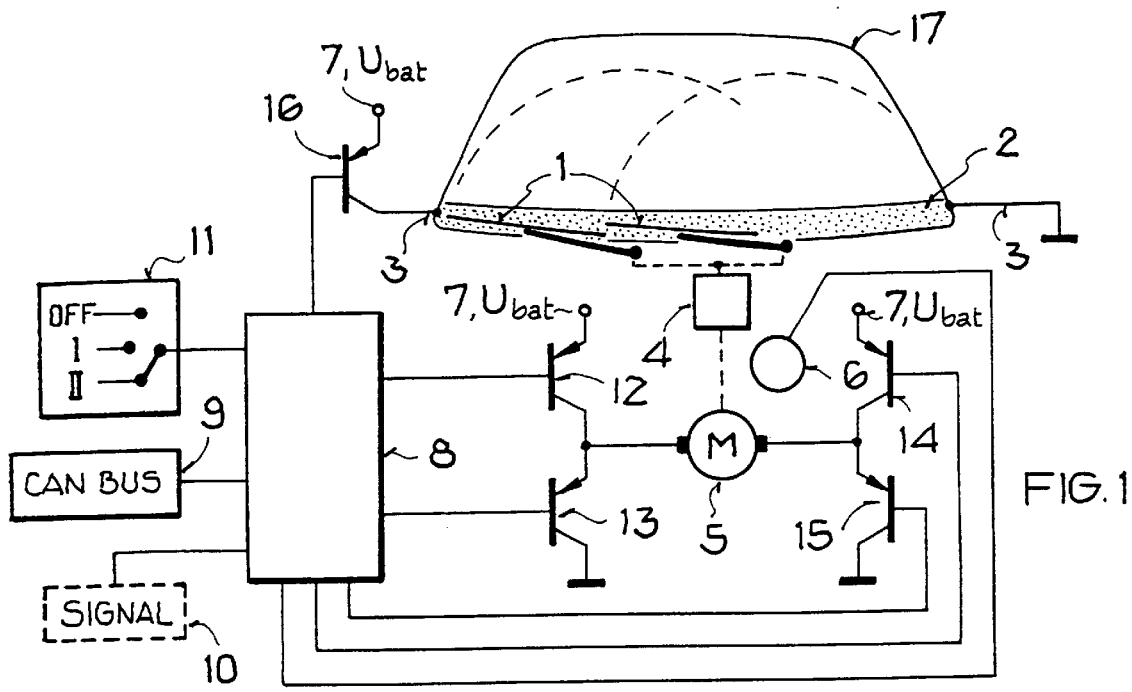
FIG. 1 Schematic structure of a wiper rest heater with revolution sensor.

FIG. 1 shows a windshield 17 with the windshield wipers 1. The wiper rest heater 2 is located on the windshield 17. It is attached there, where the rest position of the windshield wipers 1 is located in the switched off state. As a rule, the windshield wiper blade elements, which are located on the windshield wiper 1 on the side facing the windshield 17, freeze in this position. The embodiment concerns an electrical wiper rest heater 2 with the electrical supply cable 3.

The windshield wipers 1 or their rod assembly are driven via a gear 4, which is coupled to the windshield wiper motor 5. The motor 5 is supplied via a full bridge consisting of four transistors 12, 13, 14 and 15. In this case, for example, they are MOS transistors. The transistors 12, 13, 14 and 15 are operated by an intelligent control 8 with an integrated evaluation unit. This evaluation unit is used to evaluate the measured values received and to assign an event to the result of the evaluation. The intelligent control 8 is likewise connected to the revolution sensor 6, which measures the rpm at the windshield wiper motor 5 or at the gear 4. This measured value is evaluated in the intelligent control 8 and further processed.

The intelligent control 8 is likewise connected to the multi-stage switch 11, which controls the windshield wiper function, in order to take the switch position into consideration in the evaluation. The intelligent control 8 receives additional information regarding the external temperature and the operational state of the vehicle, such as whether the ignition is on or off, via a connection to a bus 9 inside the vehicle or to another signal cable 10.

After the ignition has been switched on while external temperatures are below a specific limiting value, the control 8 first triggers transistors 12 and 15 with a pulse-width modulated signal. This enables the wiper to be started up slowly with limited torque when the battery voltage 7 is applied.

If no signal or insufficient signals come from the revolution sensor 6 within a time $T_0$, then it is assumed that the windshield wiper 1 is frozen. Transistors 12 and 15 are switched off and the wiper rest heater 2 is switched on with transistor 16 and connected to the battery power supply 7. The motor 5 can be moved in the opposite direction back to the original rest position by transistors 13 and 14 to relieve the rod assembly with which the windshield wipers are moved to and fro via the gear 4.

If sufficient signals come from the revolution sensor 6 within time $T_0$, then it is assumed that nothing is frozen. Transistors 12 and 15 are switched off and the windshield wiper 1 is moved back again to its original rest position by switching transistors 13 and 14 on. The wiper rest heater 2 is not switched on.

Figure 2:
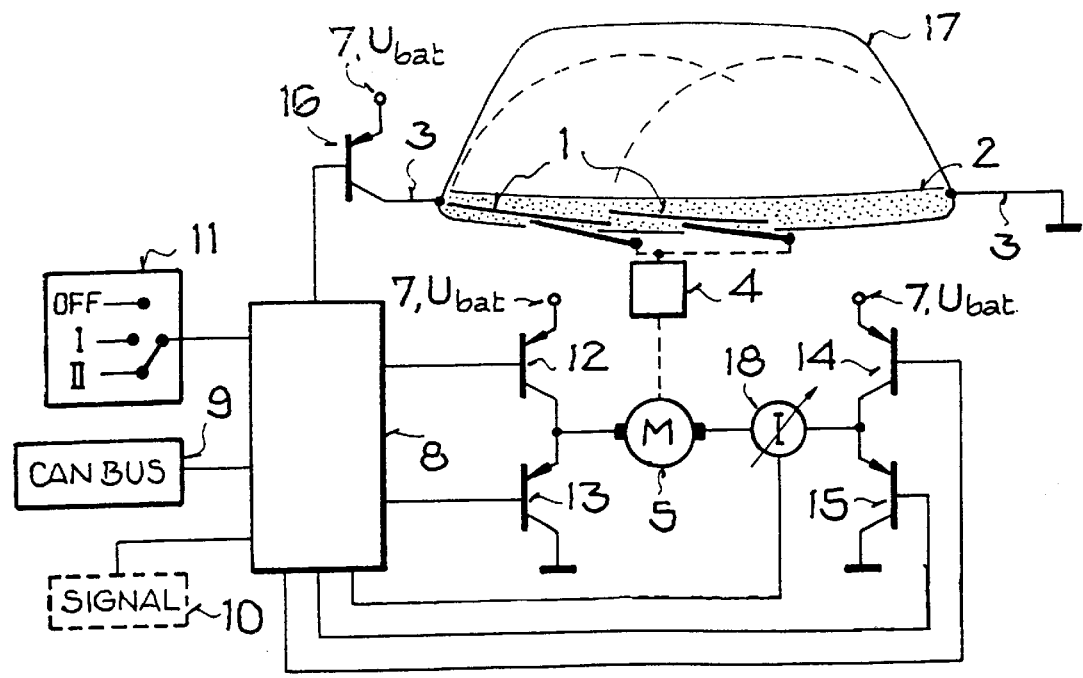
FIG. 2 Schematic structure of a wiper rest heater with ammeter.

FIG. 2 shows a windshield 17 with the windshield wipers 1. The wiper rest heater 2 is located on the windshield 17. It is attached there, where the rest position of the windshield wipers 1 is located in the switched off state. As a rule, the windshield wiper blade elements, which are located on the windshield wiper 1 on the side facing the windshield 17, freeze in this position. The embodiment concerns an electrical wiper rest heater 2 with the electrical supply cable 3.

The windshield wipers 1 or their rod assembly are driven via a gear 4, which is coupled to the windshield wiper motor 5. The motor 5 is supplied via a full bridge consisting of four transistors 12, 13, 14 and 15. The transistors 12, 13, 14 and 15 are operated by an intelligent control 8 with an integrated evaluation unit. This evaluation unit is used for evaluating the measured values received and to assign an event to the result of the evaluation.

The intelligent control 8 is likewise connected to the ammeter 18, which measures the current through the windshield wiper motor 5. If the current exceeds the maximum switch-on current for a time $t>T_0$ then it is assumed that the motor 5 is blocked. If the external temperature is also sufficiently low, then the wiper rest heater 2 is switched on.

This takes place by the measured value of the current through the motor 5 being evaluated and further processed in the intelligent control 8. Likewise, the intelligent control 8 is connected to the multi-stage switch 11, which controls the windshield wiper function, in order to take the switch setting into consideration in the evaluation. The intelligent control 8 receives additional information regarding the external temperature and the operating state of the vehicle, such as whether the ignition is on or off, via a connection to a bus 9 inside the vehicle or to another An signal cable 10.

After the ignition has been switched on while external temperatures are below a specific limiting value, the control 8 first triggers transistors 12 and 15. This enables the wiper to be started up slowly with limited torque when the battery voltage 7 is applied. Nevertheless, the slow start-up of the windshield wiper I is not absolutely necessary, thus it would suffice to have one switch, which switched the motor 5 off when the current exceeds the maximum permitted switch-on current for a time $t>T_0$. For this it is only important that the forces which are exerted on motor, gear and windshield wiper blade elements are limited.

If the measured current value exceeds the maximum switch-on current for a time $t>T_0$ then it is assumed that the windshield wiper 1 is frozen. Transistors 12 and 15 are switched off and the wiper rest heater 2 is switched on with transistor 16, and connected to the battery power supply 7. The motor 5 can be moved in the opposite direction back to the original rest position by transistors 13 and 14 to relieve the rod assembly with which the windshield wipers are moved to and fro via the gear.

On the other hand, if the measured current value does not exceed the maximum switch-on current, then it must be assumed that nothing is frozen. Transistors 12 and 15 are switched off and the windshield wiper 1 is moved once again to its original rest position by switching transistors 13 and 14 on. The wiper rest heater 2 is not switched on. The windshield wiper functions can be called up without danger by actuating the multi-stage switch 11.

Figure 3:
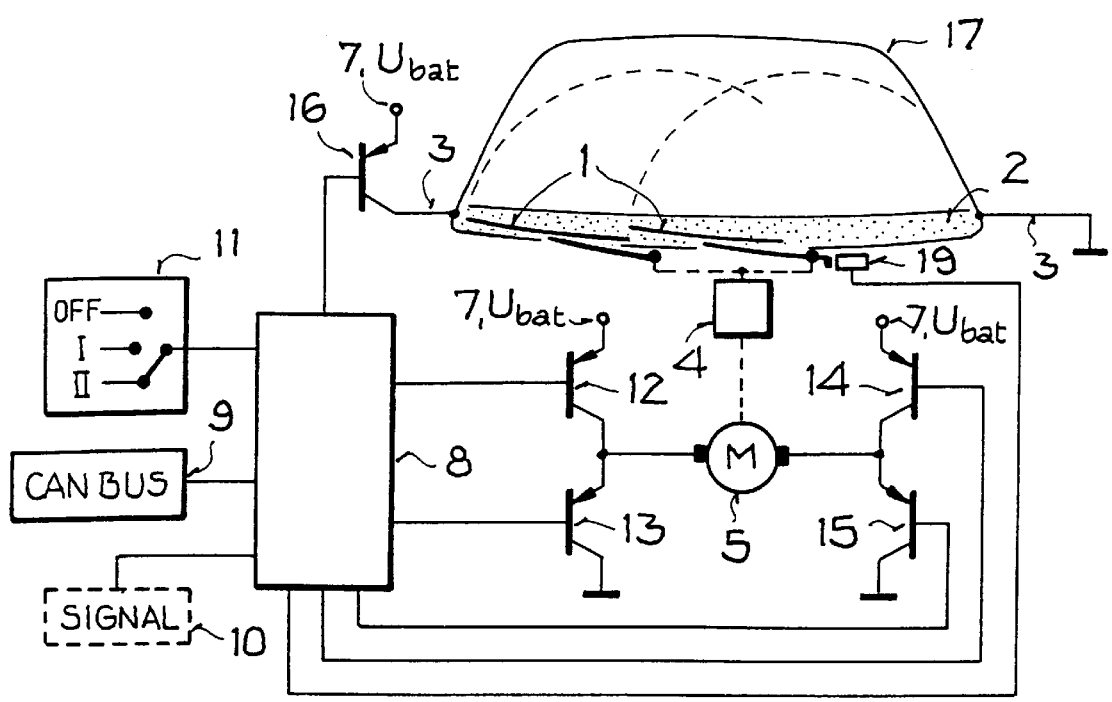
FIG. 3 Schematic structure of a wiper rest heater with movement sensor.

FIG. 3 shows a windshield 17 with the windshield wipers 1. The wiper rest heater 2 is located on the windshield 17. It is attached there, where the rest position of the windshield wipers 1 is located in the switched off state. As a rule, the windshield wiper blade elements, which are located on the windshield wiper 1 on the side facing the windshield 17, freeze in this position. The embodiment concerns an electrical wiper rest heater 2 with the electrical supply cable 3.

The windshield wipers 1 are driven via a gear 4, which is coupled to the windshield wiper motor 5. The motor 5 is supplied via a full bridge consisting of four transistors 12, 13, 14 and 15. The transistors 12, 13, 14 and 15 are operated by an intelligent control 8 with an integrated evaluation unit. This evaluation unit is used for evaluating the received measured values and assigning an event to the result of the evaluation.

The intelligent control 8 is likewise connected to the movement sensor 19. In the simplest embodiment, this can be designed as a light barrier. The movement sensor 19 directly measures whether the windshield wipers 1 move within a defined time To or how quickly they move. This result is evaluated and further processed in the intelligent control 8.

Likewise, the intelligent control 8 is connected to the multi-stage switch 11, which controls the windshield wiper function, in order to take the switch setting into consideration in the evaluation. The intelligent control 8 receives additional information regarding the external temperature and the operating state of the vehicle, such as whether the ignition is on or off, via a connection to a bus 9 inside the vehicle or to another signal cable 10.

After the ignition has been switched on while external temperatures are below a specific limiting value, the control 8 first triggers transistors 12 and 15. The battery voltage 7 is applied and the windshield wipers I are observed for a defined time To to see whether they move or not. If no or only insufficient movement of the windshield wipers 1 is detected, then the motor is switched off again. It is now assumed that the windshield wipers 1 are frozen. The wiper rest heater 2 is switched on with transistor 16 and connected to the battery power supply 7. The motor 5 can be moved in the opposite direction back to the original rest position by transistors 13 and 14 to relieve the rod assembly, with which the windshield wipers are moved via the gear (4), and to relieve the windshield wiper/s 1 itself/themselves.

If a significant movement is detected by the movement sensor, then it must be assumed that nothing is frozen. Transistors 12 and 15 are switched off and the windshield wiper 1 is moved once again to its original rest position by switching transistors 13 and 14 on. The wiper rest heater 2 is not switched on. A time factor can also be added in order to limit the forces when the wiper motor is switched on. If the movement sensor does riot detect any movement within a specific time period after switching the wiper motor on, then the motor is switched off in good time before damage occurs to the motor or the wiper blade elements.

In the embodiments, the wiper rest heater 2 is therefore only switched on if the windshield wiper/s 1 is/are actually frozen. Furthermore, the wiper rest heater is automatically switched off when the windshield wipers 1 can move freely again.

The test whether anything is frozen can be performed either when switching on the ignition, when releasing the central locking or at regular intervals during the journey. Furthermore, this test can be performed each time the wipers 1 are switched on and thus prevent damage to the wipers. It also proves to be advantageous to make this test subject to the external temperature. Should a fault then be detected, this can be indicated to the driver.

It is advantageous in all embodiments to switch the wiper rest heater 2 off when the windshield wiper/s is/are freely moveable again. For safety reasons, a delay time must be provided here between detecting that the windshield wiper 1 can move again and switching off the wiper rest heater 2.

Figure 4:
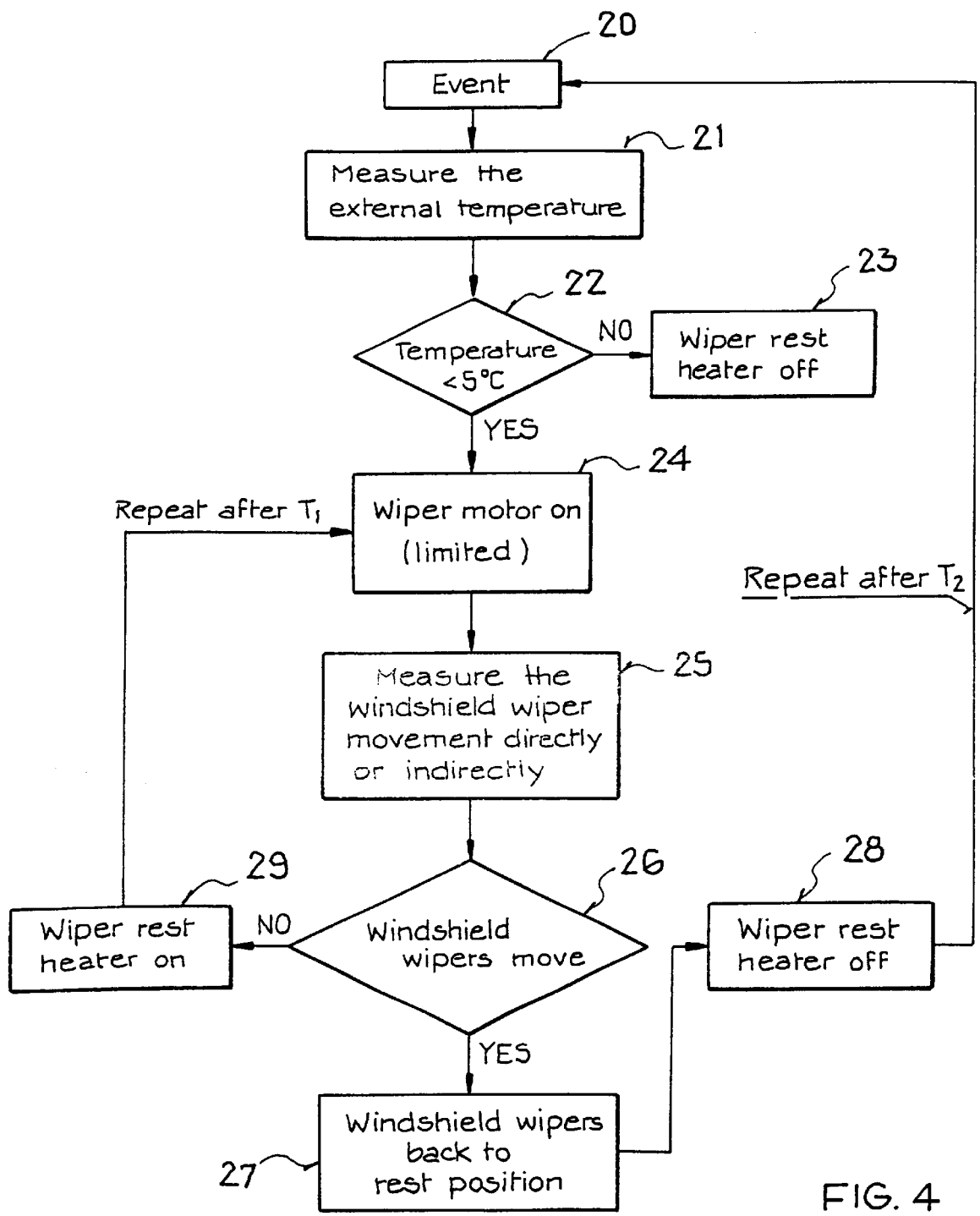
FIG. 4 Flow diagram for controlling a wiper rest heater.

In order to make this clear, FIG. 4 shows a flow diagram for the intelligent control of the wiper rest heater. An event stands in the first position (20) so that the intelligent control can be activated. This event can be unlocking the vehicle, opening the driver's door or switching the ignition on. However, the subsequent sequence can be initiated at regular intervals during the journey.

The external temperature is measured immediately after the event occurs (21). Then the measured temperature is compared with a set value (22). If the temperature lies above the freezing point, then the wiper rest heater remains off (23). If the temperature lies below the set value, e.g. 5° C., then the windshield wiper motor is switched on (24).

After switching on the wiper motor, the direct (e.g. by movement sensor) or indirect (e.g. by revolution sensor or measuring the current) measurements of the mobility of the windshield wiper are made (25). The evaluation of the measurement results establishes whether the windshield wipers move or not (26). If the windshield wipers move (26) then, in order to relieve the rod assembly, the windshield wipers are returned to their rest position (27) after the movement of the windshield wipers has been detected. Then the wiper rest heater is or remains switched off (28). After a defined time $T_2$, the external temperature is measured again (21) and the entire procedure from step (20) to step (27) is repeated. If the windshield wipers do not move, then the wiper rest heater is switched on (29). This remains on for a defined time $T_1$. After which another check is made as to whether the windshield wipers are de-iced or not. To do this, the wiper motor is once again switched into limited operation mode (this means that the wiper mode is not overloaded or the windshield wiper blade elements ripped off) and steps (24) to (26) are repeated.

The use of such wiper rest heaters is not limited to the motor vehicle, they are also useful in the fields of sea and air travel.

While the above detailed description describes the preferred embodiment of the present invention, the invention is susceptible to modification, variation and alteration without deviating from the scope and fair meaning of the subjoined claims.

What is claimed is:

1. A wiper rest heater for de-icing frozen or snowed-in windshield wipers, in which the windshield wipers are driven by a wiper motor, comprising the wiper rest heater connected to:

a sensor which measures whether one or a plurality of windshield wipers move while the wiper motor is switched on; and an intelligent control which switches the wiper rest heater on and off as a function of the value measured by the sensor.

2. The wiper rest heater according to claim 1, wherein the wiper rest heater is only switched on if the windshield wipers are frozen.

3. The wiper rest heater according to claim 1, wherein the wiper rest heater is only switched off when the windshield wipers are once again freely movable.

4. The wiper rest heater according to claim 1, wherein the sensor on the wiper motor is a revolution sensor.

5. The wiper rest heater according to claim 1, wherein the sensor is a revolution sensor for a gear for the windshield wiper.

6. The wiper rest heater according to claim 1, wherein the sensor is an ammeter which measures the current through the wiper motor.

7. The wiper rest heater according to claim 1, wherein the sensor is a movement sensor which senses the movement of the windshield wipers.

8. A wiper rest heater arrangement for de-icing frozen or snowed-in windshield wipers, in which the windshield wipers are driven by a wiper motor, said arrangement comprising:

a wiper rest heater to be attached to a windshield acted upon by the wiper;

a sensor that measures whether one or a plurality of windshield wipers move when the wiper motor is switched on; and, an intelligent control that is responsive to the output signal of the sensor and that switches the wiper rest heater on and off as a function of whether or not the windshield wiper is frozen or moving, respectively.

9. A wiper rest heater arrangement according to claim 8, wherein the control switches the wiper rest heater on only if the windshield wipers are frozen.

10. A wiper rest heater arrangement according to claim 9, wherein the control switches the wiper rest heater off only switched when the windshield wipers become moveable.

11. A wiper rest heater arrangement according to claim 8, wherein the sensor is a revolution sensor for the wiper motor.

12. A wiper rest heater arrangement according to claim 8, wherein the sensor is a revolution sensor on a gear for the windshield wipers.

13. A wiper rest heater arrangement according to claim 8, wherein the sensor is an ammeter that measures the current through the wiper motor.

14. A wiper rest heater arrangement according to claim 8, wherein the sensor is a movement sensor that senses the movement of the windshield wipers.

* * * * *